United States Patent [19]
Campbell

[11] Patent Number: 5,048,229
[45] Date of Patent: Sep. 17, 1991

[54] TREE TRUNK PROTECTOR

[76] Inventor: Van-De R. Campbell, 1330 NW. 56th Ave., Lauderhill, Fla. 33313

[21] Appl. No.: 246,876

[22] Filed: Oct. 28, 1988

[51] Int. Cl.⁵ ............................................. A01G 17/12
[52] U.S. Cl. ........................................ 47/24; 52/728
[58] Field of Search .................. 47/23, 24, 25, 32, 33, 47/30; 52/728

[56] References Cited

U.S. PATENT DOCUMENTS

| | | | |
|---|---|---|---|
| 145,585 | 12/1873 | Neff | 47/23 |
| D. 162,243 | 2/1951 | Simmons | 47/23 X |
| 313,424 | 3/1885 | Hughes | 47/25 |
| 514,306 | 2/1894 | Clines | 47/23 |
| 770,461 | 9/1904 | Haggerty | 47/23 |
| 933,654 | 9/1909 | Lippincott | 47/23 |
| 1,764,442 | 6/1930 | Hansen | 47/23 |
| 1,875,533 | 9/1932 | Weaver | 47/23 |
| 1,879,813 | 9/1932 | Molitor | 47/23 |
| 3,396,488 | 8/1968 | Ries | 47/33 |
| 3,826,040 | 7/1974 | Roberts | 47/25 X |
| 4,700,507 | 10/1987 | Allen | 47/23 |

FOREIGN PATENT DOCUMENTS

| | | | |
|---|---|---|---|
| 444111 | 3/1910 | France | 47/24 |
| 2129664 | 5/1984 | United Kingdom | 47/30 |

Primary Examiner—Henry E. Raduazo

[57] ABSTRACT

A device for surrounding the trunk of trees comprising of two or more vertical pieces joined together by locking apparatus. Devices vary in size to accommodate different size trees. Once the device is installed, it serves to safeguard the lower trunk of trees from bumps and cuts.

3 Claims, 1 Drawing Sheet

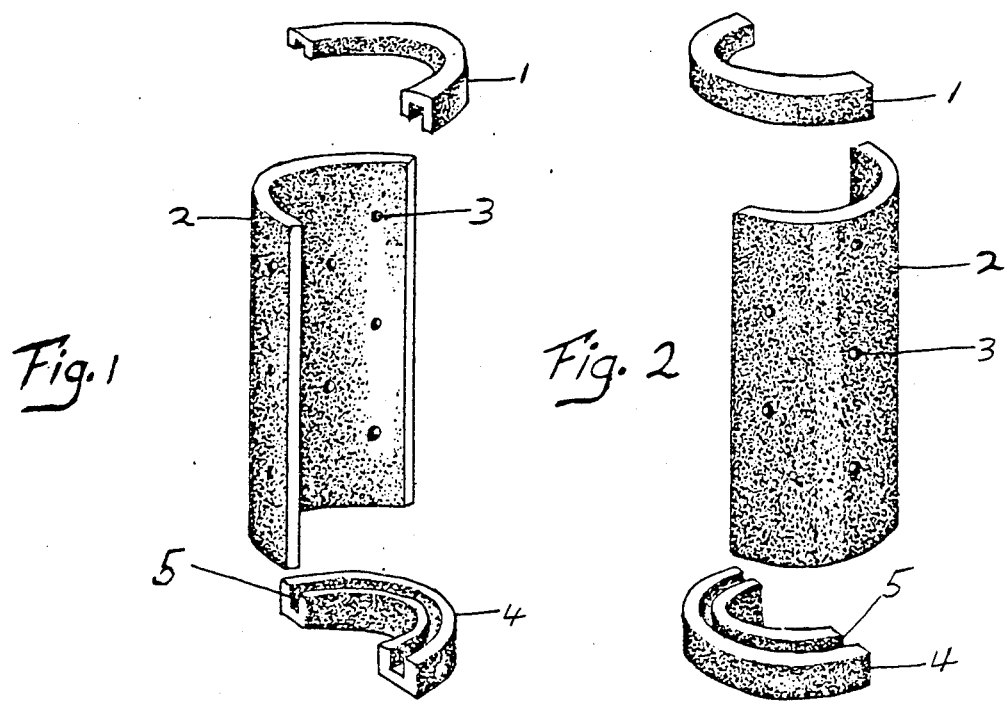
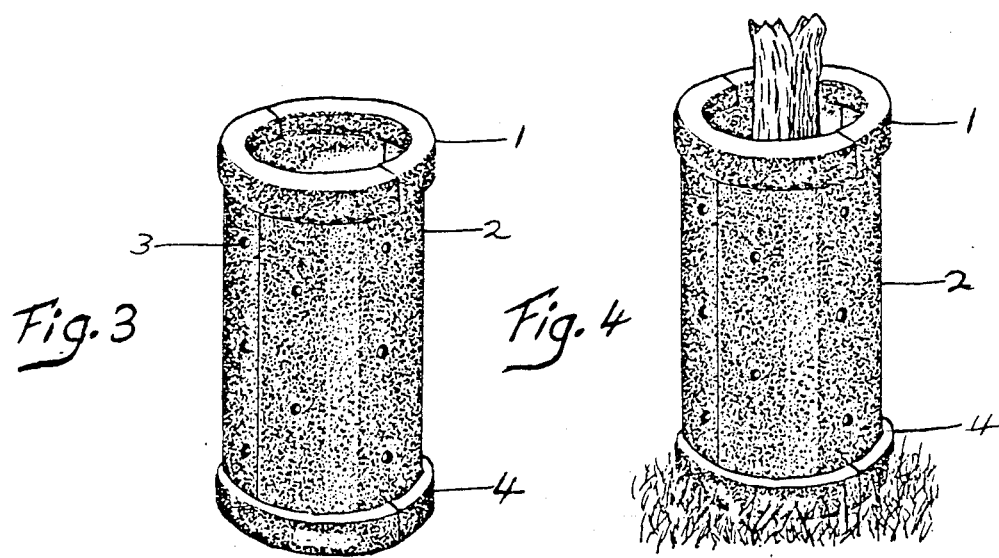
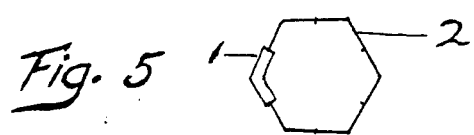

TREE TRUNK PROTECTOR

BACKGROUND

Field of Invention

This invention relates to the protection of tree trunks, especially (but not limited to) saplings-the bark of which is not yet hard enough to resist bumps and cuts; as a result, the tree suffers severe damage and in some cases, death.

BACKGROUND

Description of Prior Art

Many, if not most homeowners, tree growers, and parks administrators plant small trees. In many cases the bark of these trees are damaged during general maintenance of the premises. Other than make-shift devices and in some cases the use of wire mesh to repel rabbits and other predators from eating the bark of trees, there is no prior art; except that pre-manufactured plastic sheets and tubes will be employed. Therefore, a wide variety of protectors have been proposed and implemented to solve this problem.

OBJECTS AND ADVANTAGES

Accordingly, I claim the following as my object and advantages of the invention: to provide a product varying in diameter, circumference, and length; which is durable neat, and easy to assemble-requiring minimum maintenance once installed around the trunk of trees, to provide a product which will minimize damage to the trunk of trees and to provide a product which is aesthetically pleasing to its user and compliments the environment.

DRAWING FIGURES

FIG. 1 (three parts) Top section shows the top one-half locking device for securing one seam of the two half sides; a cylindrical one-half round side with several ventilation holes and a bottom one-half locking device for securing one seam of the two half sides.

FIG. 2 (three parts) Shows the other half of the unit. All three parts are a refection of the parts of FIG. 1 and serve in an identical capacity.

FIG. 3 Shows the unit's six sections when assembled

FIG. 4 Serves to illustrate the assembled unit in operation.

FIG. 5 Shows that the unit following the steps of FIG. 1 and FIG. 2 can be produced angularly.

SINGLE PIECE DESCRIPTION

FIG. 1 Shows three of six pieces that comprise the total unit. The top piece of this figure shows a locking device which is made of plastic, or the like, molded to shape. The middle piece of this figure shows an elongated semi-circle which is perforated and is made from pre-manufactured plastic pipe, or the like, cut in half. The bottom section of this figure is the same as the top section and serves as a bottom locking device.

UNIT ASSEMBLAGE AND OPERATION

The two middle sections of FIG. 1 and FIG. 2 are placed around a tree. These pieces are then inserted into two bottom locking devices. The middle of the two locking devices are placed on the seams where the two middle pieces come together. This process is repeated for the two top locking devices. Once these processes are completed, the lower trunk of a tree is now protected from lateral bumps and cuts.

RECOMMENDED USE

FIG. 4 illustrates the completed unit in use. It also shows that there is sufficient space between the inner edge of the unit and the outer edge of the tree which enables the tree to breath and have room for expansion.

While the above description contains many specifics, the reader should not conclude these as limitations on the scope of the invention, but rather a present conclusive approach in the manifestation of the invention. Those skilled in the are of design, will envision that many other variations are within its scope. For example skilled artisans will be able to change the four locking devices of FIG. 1 and FIG. 2 to a single locking device. They will also be able to create a textured outer surface resembling that of a tree or modify its use serving also as a drip fertilizing unit. They can also change the ventilation holes shown in FIG. 1 and FIG. 2 to slots or they can mold the entire unit out of a single piece of material with a scored or hinged back and self locking front device. Accordingly the reader is therefore requested to determine the scope of the invention by the appended claims and their legal equivalents, and not only by the examples which have been given.

I claim:

1. A tree protector comprising at least two middle piece members each having an upper edge, a lower edge, a pair of parallal side edges and thickness adapted to enclose the trunk of a tree in order to protect the same from damage, and a series of at least four locking devices, each locking device having a channel-like cross-section of a width adapted to receive side members and having a length adapted to enclose a portion of said tree, at least two of said locking devices adapted to rest on a ground or earth surface about said tree and to receive said members in mutually locking-staggered relationship about said tree, and at least two of said locking devices adapted to engage the upper edge of said members in mutually locking staggered-relationship.

2. The tree protector of claim 1 wherein said members and said devices are semi-cylindrical.

3. The tree protector of claim 1 wherein said members and devices are semi-hexagons.

* * * * *